Sept. 9, 1941.   G. C. PEARCE   2,255,437
OVERLOAD DEVICE FOR CAPACITOR START ELECTRIC MOTORS
Filed March 26, 1938
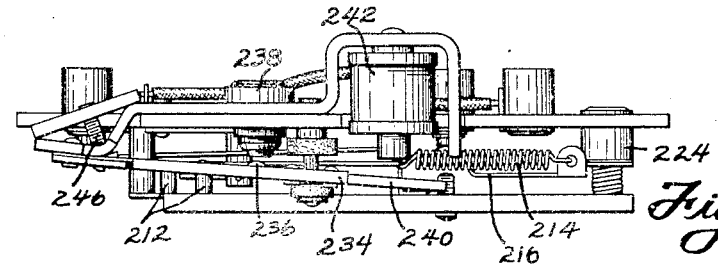
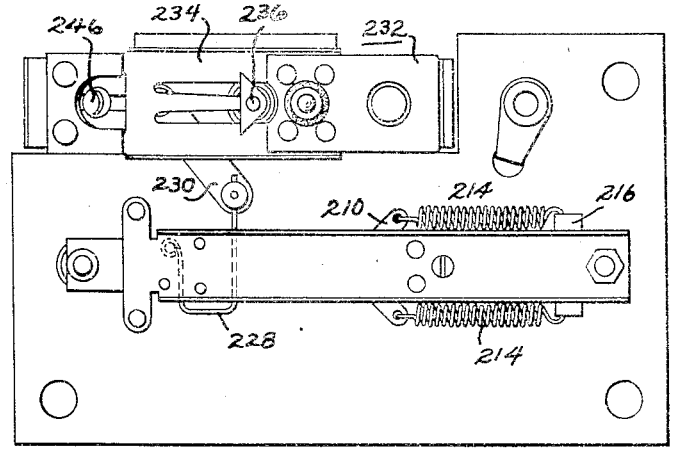
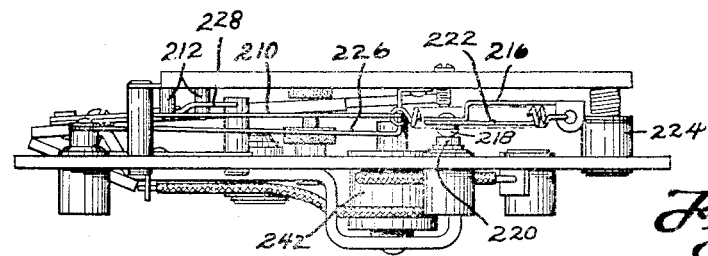
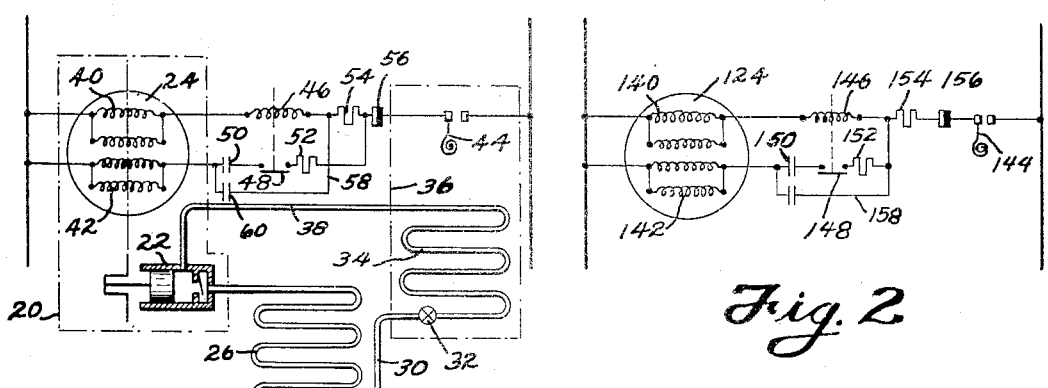
INVENTOR.
George C Pearce
BY Spencer Hardman and Fehr
ATTORNEYS Patented Sept. 9, 1941

2,255,437

UNITED STATES PATENT OFFICE 2,255,437

OVERLOAD DEVICE FOR CAPACITOR START ELECTRIC MOTORS

George C. Pearce, Dayton, Ohio, assignor to General Motors Corporation, Dayton, Ohio, a corporation of Delaware Application March 26, 1938, Serial No. 198,292

2 Claims. (Cl. 172—279)

This invention relates to refrigerating apparatus and more particularly to electric motor and control systems.

It has been found when capacitor start and capacitor type electric motors are used with refrigerating systems which occasionally provide stalling conditions, the ordinary thermal overload provided for protecting the motor does not trip with sufficient rapidity to properly protect the motor under such stalling conditions.

It is therefore an object of my invention to provide an improved overload device for capacitor and capacitor start electric motors as well as for other electric motors which will provide rapid tripping under stalling conditions and which will provide adequate protection during running conditions.

It is still another object of my invention to provide a thermal overload for electric motors which is provided with a heater in series with the main winding and a booster heater controlled by the starting relay for decreasing the tripping time of the thermal overload under stalling conditions.

It is still another object of my invention to provide a thermal overload with an improved toggle snap acting device.

Further objects and advantages of the present invention will be apparent from the following description, reference being had to the accompanying drawing, wherein a preferred form of the present invention is clearly shown.

In the drawing:

Fig. 1 is a diagrammatic view of a refrigerating system together with my improved electric motor and control system;

Fig. 2 is a view illustrating a slightly modified form of electric motor and control system for the refrigerating system shown in Fig. 1;

Fig. 3 is a front view of the thermal overload device itself, together with the starting relay;

Fig. 4 is a top view of the thermal overload device; and

Fig. 5 is a rear view of the thermal overload device.

Briefly, I have shown diagrammatically a refrigerating system of the compression type which is driven by a capacitor type electric motor having a starting relay for changing the capacitance of the phase winding. The motor is protected by the thermal overload including a main heater which may be connected in series with all the windings or which may be connected so that it is only in series with the main winding under starting conditions, but is connected in series with both windings during normal running periods. I also provide a booster heater controlled by the starting relay which adds its heat to the main heater in order to decrease the tripping time of the thermal overload under stalling conditions.

Referring now to the drawing and more particularly to Fig. 1 there is shown diagrammatically a sealed unit 20 containing a compressor 22 directly driven by a capacitor type electric motor 24. The compressor 22 forwards compressed refrigerant to a condenser 26 where the compressed refrigerant is liquefied and collected in a receiver 28. From the receiver 28 the liquid refrigerant is forwarded to a supply conduit 30 under the control of a suitable expansion valve or restrictor 32 to an evaporating means 34 located within the compartment 36 to be cooled. The liquid refrigerant evaporates within the evaporator means 34 under reduced pressure and absorbs heat from the medium within the compartment 36. The evaporated refrigerant is withdrawn from the evaporating means by the compressor through a return conduit 38.

The operation of the motor and the refrigerating system is controlled by thermostat switch means 44 located in series with all the windings of the electric motor. The refrigerating system is preferably provided with some form of unloading means preferably one in which the unloading takes place during the idle period of the system. The electric motor must at all times be properly protected from overloads during both starting and running periods. This is particularly true in a refrigerating system where the loads are quite variable and where stalling conditions of the electric motor are apt to occur when the overload device either fails to function or does not function rapidly enough, or when the idle period is so short so as not to give the unloading device sufficient time to accomplish the unloading. Another factor is the line voltage which varies according to power conditions in the supply line.

The electric motor 24 is provided with main windings 40 and phase windings 42. Connected in series with the main windings 40 is an electromagnetic coil 46 which operates the starting relay contacts 48. The starting relay contacts 48 control the flow of electric energy through a portion of a circuit which includes the capacitor 50 and the booster thermal overload heater 52. The booster overload heater 52 cooperates with the main overload heater 54 to open the thermal overload contacts 56 under stalling conditions. The thermal overload contacts 56 are located in series with all the windings and completely deenergize the motor upon the occurrence of an overload.

Heretofore only one heater in series with either the main winding or in series with both windings has been employed. However, I have found that under stalling conditions the temperature rise of a typical motor is from 174° to 276° and the trip time of the thermal overload protector is about .85 of a minute. A temperature of 276° damages the motor and therefore I have provided the booster overload heater 52 controlled by the starting contacts 48 for adding this heat to the main heater 54 under starting conditions. This reduces the tripping time to about .45 of a minute and the temperature rise of the motor was from 137° to 210°. Under abnormal operating conditions employing the booster overload the winding temperatures exceeded 220° F. for very short periods of time but in no case did the temperature of the windings exceed 250° F. The temperature rise of the windings after stalling is less than 45° F. and the overload disconnected the motor from the line in at least 30 seconds, and the average time was about 22 seconds.

After the starting period of the electric motor, the current through the electromagnetic coil 46 is reduced and it releases and opens the starting contacts 48 to deenergize the booster heater 52. The electric energy for the phase windings 42 then flows through the by-pass 58 which is provided with a capacitor 60. Under some conditions it may be possible to eliminate the conductor 58 and its capacitor 60 and rely only upon the main windings 40 for the running period.

In Fig. 2 a slightly different motor circuit is provided in which the motor 124 is provided with main windings 140 and phase windings 142. An electromagnetic coil 146 is connected in series with the main winding 140 and operates starting contacts 148 which control the flow of current through the phase winding 142, during the starting period. In this form the main thermal overload heater 154 is connected in series with all the windings of the motor 124 as are also the thermal overload contacts 156 and the thermostat 144. A booster thermal overload heater 152 is connected in series with the starting contacts 148 for adding its heat to that of the main thermal overload for reducing the tripping time under stalling conditions. A capacitor 150 is connected in series with the starting contacts 148 and a shunt 158 provided with the capacitor 160 supplies the electric energy to the phase winding 142 after the starting contacts 148 have opened.

Figs. 3, 4 and 5 show the actual construction of the thermal overload starting relay. The thermal overload has for its operating member a cantilever type of bimetal strip 210 which is anchored upon the posts 212 and is connected at its free end to a pair of tension type coil springs 214. This bimetal and the tension type coil springs form a portion of the improved toggle mechanism which includes a lever 216 connected at one end by a pair of ears to the tension type coil springs 214. The lever 216 extends towards the operating bimetal from its point of connection with the tension type coil spring. This lever 216 is fastened at the end nearest the operating bimetal 210 to the thermal overload switch contact 218 which is adapted to make contact with the cooperating contact 220. This contact 218 is fastened to a thin blade 222 of spring metal which is held under tension by the tension springs 214 and which is anchored at its other end to a post 224. This thin spring blade 222 serves to carry the current to the contact 218 and also serves as an element in the toggle mechanism. With this type of toggle mechanism the relatively slow movement of the bimetal 210 moves tension coil spring 214 and thus causes the lever 216 to be pivoted to the contact 218. This rocks the contact 218 and makes it possible for these contacts to carry a relatively great amount of current without burning or welding.

The main heater 226 heats the operating bimetal 210 at all times when the motor is energized. As mentioned before, under starting conditions this heater alone does not heat the bimetal 210 with sufficient rapidity to cause the contacts 218 and 220 to be opened in a sufficiently short time to hold the motor temperature below safe limits. Therefore a booster heater 228 is provided upon the other side of the bimetal and near its anchor post 212 for providing an additional amount of heat to the operating bimetal during the starting period. This booster heater 228 is connected by the conductor 230 to the starting relay 232 which includes the spring lever 234 provided with a contact 236 for cooperating with the contact post 238 to control the flow of electric energy through the starting circuit. The lever 234 is provided with an armature 240 which is attracted by a solenoid 242 connected in series with the main winding. I find that this construction is reliable and inexpensive and well suited for the purpose intended. The operation of the starting relay may be adjusted by the adjusting screw 246 which controls the angularity of the anchor point of the lever spring which supports the lever 234.

While the form of embodiment of the invention as herein disclosed, constitutes a preferred form, it is to be understood that other forms might be adopted, all coming within the scope of the claims which follow.

What is claimed is as follows:

1. An electric motor and control circuit comprising an electric motor having main and phase windings, overload switch means for deenergizing the motor, said overload switch means being provided with operating means having a plurality of directly associated current responsive energizing means located outside the motor, one of said current responsive energizing means being responsive to the current traversing the phase winding and another being responsive to the current traversing the main winding and the phase winding, a starting control switch in series with said one current responsive energizing means for controlling the energization of the phase winding, and means for moving said starting control switch to closed position during the starting period of the electric motor and to open position after the starting period.

2. An electric motor and control circuit including an electric motor having main and phase windings, capacitor means for said phase winding, starting switch means for controlling the effect of the capacitor means upon the phase winding, overload switch means for deenergizing the motor, said overload switch means being provided with a plurality of directly associated current controlled energizing means located outside the motor, one of said current controlled energizing means being controlled by said starting switch means, another of said current controlled energizing means being responsive to the current flowing through both windings.

GEORGE C. PEARCE.